United States Patent [19]
Hackenberg et al.

[11] 3,769,891
[45] Nov. 6, 1973

[54] PHOTOGRAPHIC APPARATUS

[75] Inventors: Hubert Hackenberg; Rainer Spinnler; Horst Karl, all of Munich, Germany

[73] Assignee: AGFA-Gevaert Aktiengesellschaft, Leverkusen, Germany

[22] Filed: Mar. 23, 1971

[21] Appl. No.: 127,237

[30] Foreign Application Priority Data
Mar. 26, 1970 Germany.................. P 20 14 671.8

[52] U.S. Cl............................. 95/31 AC, 95/31 FM
[51] Int. Cl. .......................................... G03b 19/04
[58] Field of Search ..................... 95/31 AC, 31 FL, 95/31 FM

[56] References Cited
UNITED STATES PATENTS

| | | | |
|---|---|---|---|
| 3,532,040 | 10/1970 | Ehgartner et al....................... | 95/31 |
| 3,633,477 | 1/1972 | Hackenberg et al............. | 95/31 UX |
| 3,605,595 | 9/1971 | Irwin.................................. | 95/31 X |
| 3,603,236 | 9/1971 | Engelsmann....................... | 95/31 X |

*Primary Examiner*—Samuel S. Matthews
*Assistant Examiner*—Michael L. Gellner
*Attorney*—Michael S. Striker

[57] ABSTRACT

A still camera for use with film having a row of perforations, one for each film frame, has a toothed film transporting wheel which is rotatable by a rapid-transport lever in a first direction to rotate the takeup reel in a direciton to collect the film, and is permanently biased in the other direction. The feeler of a scanning lever is biased against the film in response to rotation of the wheel in the first direction to penetrate into an oncoming perforation and to thereby move a bell crank from a first to a second angular position. The bell crank has a first pallet which engages the teeth of the wheel and holds the latter against rotation in the other direction in the first position of the bell crank and a second pallet which engages the teeth to hold the wheel against rotation in the first direction in the second position of the bell crank. The wheel also serves to cock an impeller in response to rotation in the first direction whereby the impeller causes the feeler to bear against the film. The impeller can be released from the cocked position by a release element to thereby strike against a shutter blade which opens to admit scene light against an unexposed film frame which is located behind the picture taking lens when the feeler extends into a perforation. The feeler is withdrawn from the perforation and the bell crank is caused to reassume the first position when the impeller returns to its uncocked position.

29 Claims, 2 Drawing Figures

PHOTOGRAPHIC APPARATUS

BACKGROUND OF THE INVENTION

The present invention relates to photographic apparatus, especially to still cameras, and more particularly to improvements in photographic apparatus for use with roll film having a row of perforations, one for each film frame. Still more particularly, the invention relates to improvements in photographic apparatus of the type wherein a scanning member tracks the row of perforations of the film and enters an oncoming perforation to thereby effect the termination of film transport at the time when the film has been advanced by the length of a frame.

SUMMARY OF THE INVENTION

An object of the invention is to provide a novel and improved film transporting mechanism for use in a photographic apparatus which employs roll film of the type having a row of perforations, one for each film frame.

Another object of the invention is to provide a novel and improved blocking device for automatically preventing further transport of film when the film transporting mechanism places a fresh frame into registry with the picture taking lens of the photographic apparatus.

A further object of the invention is to provide a photographic apparatus of the above outlined character wherein the film can be transported in a novel way by means of a rapid transport lever.

An additional object of the invention is to provide a novel and improved operative connection between the film transporting mechanism, the film scanning device and the blocking device for film transporting mechanism in photographic apparatus which utilize roll film having a row of perforations, one for each film frame.

Still another object of the invention is to provide a photographic apparatus of the above outlined character with a film transporting mechanism which can operate properly when the scanning device tracks a portion of of the film which is without perforations or a strip which is attached to the leading or trailing end of the film and is also without perforations to thus insure satisfactory transport of the film even if the scanning device fails to detect perforations at regular intervals.

In accordance with a feature of the invention, the improved photographic apparatus comprises a housing or body including means defining a path for roll film of the type having a row of perforations, one for each film frame, film transporting means mounted in the housing and including a wheel or an analogous transporting member which is rotatable in a first direction to thereby transport the film along the path and in a second direction to return to a starting position, scanning means including feeler means arranged to track the film along the film path and to enter an oncoming perforation, and blocking means movable by the scanning means from a first to a second position in response to entry of the feeler means into a perforation. The blocking means comprises a first portion which prevents rotation of the transporting member in the second direction in the first position of the blocking means and a second portion which prevents rotation of the transporting member in the first direction in the second position of the blocking means, i.e., in response to penetration of the feeler means into an oncoming perforation.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
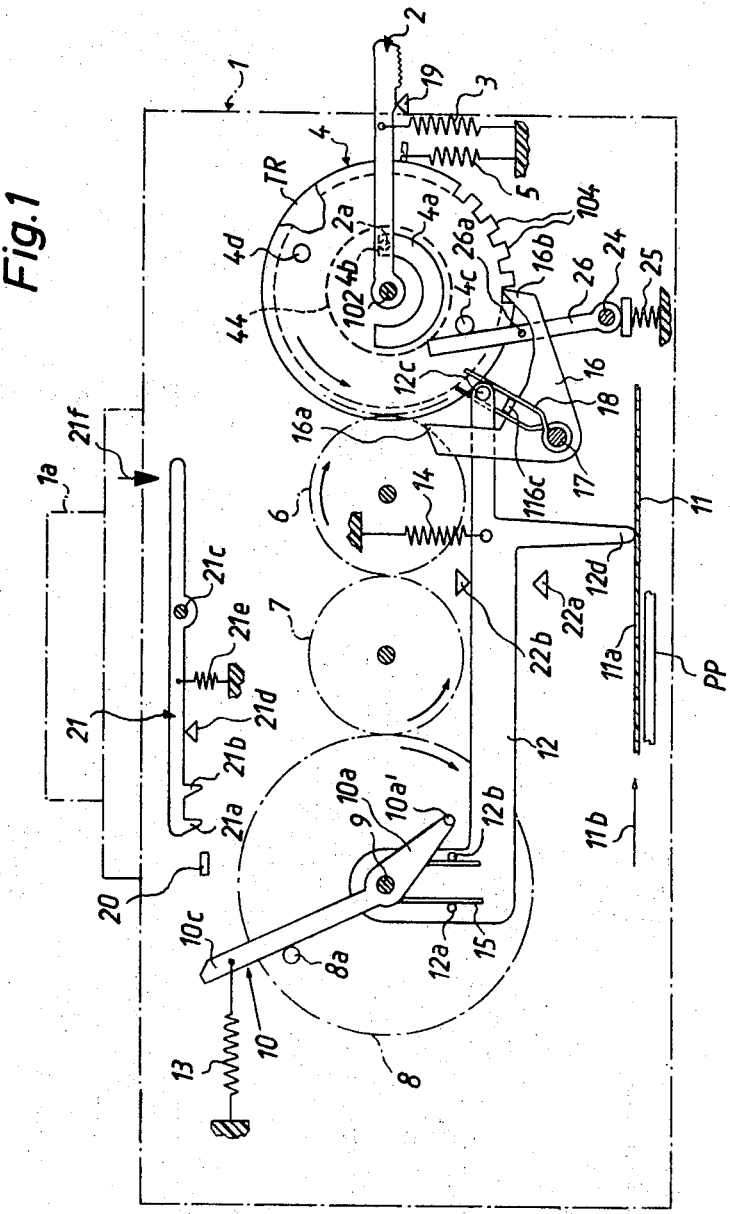
FIG. 1 is a schematic horizontal sectional view of a still camera which embodies one form of the invention.

Referring first to FIG. 1, there is shown a still camera having a housing or body 1 including a front wall which carries a mount 1a for a picture taking lens. The camera further comprises a film transporting mechanism including a so-called rapid transport lever 2 which is accessible from without the housing 1 and can rotate a takeup reel TR in the housing by way of a wheel-shaped film transporting member 4 and a one-way clutch 44 which is interposed between the wheel 4 and takeup reel TR. The lever 2 is pivotable on a vertical shaft 102 which is coaxial with the wheel 4 and takeup reel TR. A helical spring 3 is provided to normally bias the lever 2 to a starting position in which the lever bears against a fixed stop 19 in or on the housing 1.

An intermediate portion of the rapid transport lever 2 carries a motion transmitting projection or pin 2a which extends into an arcuate slot or groove 4a of the wheel 4. The latter is formed with an annulus of gear teeth 104 meshing with the teeth of a first intermediate gear 6. The gear 6 meshes with a second intermediate gear 7 which drives a further gear 8 rotatable about the axis of a shaft 9. A helical spring 5 is attached to the housing 1 and tends to rotate the wheel 4 in a clockwise direction as viewed in FIG. 1. The wheel 4 is arrested in a starting position when its end face 4b abuts against the pin 2a while the lever 2 abuts against the stop 19.

The wheel 4 forms part of a gear train which further includes the gears 6, 7 and 8. The latter is provided with an eccentric motion transmitting or cocking pin 8a which can pivot an actuating member or impeller 10 rotatable about the axis of the shaft 9. The impeller 10 has a longer arm 10c which is attached to a helical spring 13 serving to urge the arm 10c against the cocking pin 8a and to store energy when the impeller 10 is rotated in a clockwise direction from the illustrated uncocked or inoperative position in response to a counterclockwise rotation of the wheel 4. A shorter arm 10a of the impeller 10 carries a stud 10a' which can engage one leg of a torsion spring 15. The latter is convoluted around the shaft 9 and its legs bear against two posts 12a, 12b on a scanning or sensing lever 12. When the stud 10a' engages the right-hand leg of the torsion spring 15, the scanning lever 12 tends to pivot on the shaft 9 in a clockwise direction, as viewed in FIG. 1, against the opposition of a helical return spring 14 which is attached to a portion of the housing 1. The scanning lever 12 is movable between two abutments 22a, 22b and has an extension or feeler 12d which bears against the front side of photographic roll film 11 so as to penetrate into an oncoming perforation 11a of the film under the action of the stud 10a' and torsion spring 15. The scanning lever 12 bears against the abutment 22b under the action of the return spring 14 when the stud 10a' of the impeller 10 is disengaged from the adjacent leg of the torsion spring 15. When the torsion spring 15 is deformed by the stud 10a' and the feeler 12d extends into a perforation 11a of the film 11, the scanning lever 12 bears against the abutment 22a. The film 11 is guided along a predetermined film path in front of a conventional pressure plate PP and behind a window (not shown) which registers with the objective in the lens mount 1a. The distance between the perforations 11a is such that a fresh film frame is located behind the lens mount 1a whenever the feeler 12d of the scanning lever 12 enters an oncoming perforation 11a. The film 11 is being paid out by a supply reel (not shown) and is collected by the takeup reel TR when the wheel 4 is rotated in a counterclockwise direction by way of the rapid transport lever 2. The direction of film transport is indicated by the arrow 11b. The bias of the torsion spring 15 exceeds the bias of the return spring 14.

The camera further comprises a blocking or arresting device here shown as a bell crank 16 having two integral arms provided with blocking portions or pallets 16a and 16b. The bell crank 16 is pivotable on a shaft 17 and has a projection or lug 116c flanked by the legs of a torsion spring 18 which is convoluted around the shaft 17. The legs of the torsion spring 18 further flank a pin or stud 12c of the scanning lever 12. When the spring 14 is free to maintain the scanning lever 12 in engagement with the abutment 22b, the bell crank 16 dwells in the illustrated first position and its pallet 16b extends into the adjacent space between two teeth 104 of the wheel 4 to thus prevent a clockwise rotation of the wheel under the action of the spring 5. When the feeler 12d is caused to penetrate into an oncoming perforation 11a under the action of the torsion spring 15 and stud 10a' of the impeller 10, the scanning member 12 engages the abutment 22a and its stud 12c causes the torsion spring 18 to pivot the bell crank 16 in a clockwise direction, as viewed in FIG. 1, to a second position so that the pallet 16b is disengaged from the teeth 104 but the pallet 16a engages the adjacent teeth 104 in such a way that the wheel 4 is held against rotation in a counterclockwise direction but is free to rotate clockwise under the action of the spring 5. The pallet 16b remains in the first position (in the space between the adjacent teeth 104 of the wheel 4) even when the stud 10a' bears against the adjacent leg of the torsion spring 15 so that the feeler 12d is biased against the film 11. The latter offers sufficient resistance to pivotal movement of the scanning lever 12 in a clockwise direction to prevent disengagement of the pallet 16b from the wheel 4 before the feeler 12d enters an oncoming perforation 11a.

The camera further comprises a release element 21 here shown as a two-armed lever which is pivotable on a pin 21c and is biased against a stationary stop 21d by a helical spring 21e. The left-hand arm of the release element 21 has two rearwardly extending retaining projections or teeth 21a, 21b either one of which can prevent the arm 10c of the impeller 10 from moving in a counterclockwise direction after the arm 10c has been rotated by the cocking pin 8a of the gear 8 to such an extent that its tip moves to a position located to the right of the tooth 21a or 21b, as viewed in FIG. 1. The shutter of the camera comprises at least one blade 20 which normally assumes a closed position under the action of a suitable spring (not shown) and is propelled to an open position in response to pivoting of the release element 21 in the direction indicated by the arrow 21f. Such pivoting of the release element 21 causes the tooth 21a or 21b to become disengaged from the arm 10c of the impeller 10 so that the latter can pivot under the action of the spring 13 and causes its arm 10c to strike against the shutter blade 20. The blade 20 is mounted in such a way that it can be bypassed by the arm 10c when the latter is moved clockwise by the cocking pin 8a but that it extends into the path of the arm 10c when the latter pivots under the action of the spring 13. Such types of shutters are well known in the art. Reference may be had to U.S. Pat. No. 3,526,178 granted to Fauth and owned by the assignee of the present application.

The operation:

FIG. 1 illustrates the parts of the camera in positions they assume upon completion of an exposure. The impeller 10 is held in the uncocked or inoperative position and bears against the eccentric pin 8a of the gear 8 under the action of the spring 13. The spring 14 maintains the scanning lever 12 in engagement with the abutment 22b and the stud 12c of the lever 12 causes the torsion spring 18 to maintain the pallet 16b of the bell crank 16 in engagement with the adjacent teeth 104 of the wheel 4. The rapid transport lever 2 abuts against the stop 19 under the action of the spring 3 and the end face 4b in the groove 4a of the wheel 4 abuts against the pin 2a under the action of the spring 5. The release element 21 abuts against the top 21d under the action the spring 21e.

Prior to making the next exposure, the user of the camera must transport the film 11 by the length of a frame. Repeated actuation of the release element 21 prior to completion of film transport would not result in admission of scene light because the arm 10c of the impeller 10 is located to the left of the shutter blade 20. To transport the film, the user pivots the lever 2 in a counterclockwise direction, as viewed in FIG. 1, whereby the pin 2a bears against the end face 4b and rotates the wheel 4 in a counterclockwise direction. The one-way clutch 44 causes the takeup reel TR to rotate with the wheel 4 whereby the film 11 advances in the direction indicated by the arrow 11b. As the wheel 4 rotates, it drives the transmission including the gears 6, 7 and 8 whereby the eccentric cocking pin 8a of the gear 8 pivots the impeller 10 in a clockwise direction. The springs 3 and 5 are caused to store energy, together with the spring 13 which causes the arm 10c of the impeller 10 to bear against the cocking pin 8a. The torsion spring 18 yields when the wheel 4 rotates in a counterclockwise direction so that the pallet 16b of the bell crank 16 rides over successive teeth 104 but prevents the wheel 4 from rotating in a clockwise direction under the action of the spring 5. The purpose of the pallet 16b is to prevent clockwise rotation of the wheel 4 if the rapid transport lever 2 is released by the operator's fingers prior to completion of film transport by the length of a frame. The lever 2 is free to return into engagement with the stop 19 as soon as its exposed portion is released because the spring 3 is mounted in prestressed condition and is able to pivot the lever 2 with reference to the wheel 4 whereby the pin 2a travels in the groove 4a in a direction away from the end face 4.

As mentioned before, the arm 10c of the impeller 10 can bypass or move beyond the shutter blade 20 while the impeller rotates in a clockwise direction with the cocking pin 8a of the gear 8. Once the arm 10c moves beyond the tooth 21a or 21b of the release element 21, it cannot return to the illustrated uncocked or inoperative position even if the gear 8 is caused to rotate in a counterclockwise direction to move the pin 8a away from the arm 10c because the latter is held by the tooth 21a or 21b as long as the release element 21 remains in the illustrated starting position. While the cocking pin 8a pivots the impeller 10 in a clockwise direction, the stud 10a' on the arm 10a of the impeller 10 stresses the torsion spring 15 which urges the feeler 12d of the scanning lever 12 against the front side of the film 11 while the film advances in the direction indicated by the arrow 11b. When the feeler 12d is caused by torsion spring 15 to penetrate into the oncoming perforation 11a of the film 11, the stud 12c of the scanning lever 12 pivots the bell crank 16 in a clockwise direction to a second position so that the pallet 16b becomes disengaged from the adjacent teeth 104. At the same time, the pallet 16a engages the nearest tooth 104 and prevents further rotation of the wheel 4 in a counterclockwise direction, i.e., in a direction to move the film 11 in the direction indicated by the arrow 11b. The pallet 16a does not interfere with the clockwise rotary movement of the wheel 4 so that the wheel 4 rotates under the action of the spring 5 and comes to a halt when the end face 4b in the groove 4a engages the pin 2a of the rapid transport lever 2 which is assumed to abut against the stop 19. The gears 6, 7 then cause the gear 8 to rotate in a counterclockwise direction and to move its cocking pin 8a away from the arm 10c of the impeller 10. However, the latter cannot pivot under the action of the spring 13 because its arm 10c is engaged by the tooth 21a or 21b of the release element 21. It can happen that the pin 8a of the gear 8 moves the arm 10c in a clockwise direction beyond the right-hand tooth 21b. This does not affect the operation of the camera because, as the wheel 4 rotates in a clockwise direction under the action of the spring 5 and the gears 6, 7 drive the gear 8 in a counterclockwise direction to move the pin 8a back to the position shown in FIG. 1, the arm 10c can pivot under the action of the spring 13 only until it reaches the nearest tooth, e.g., the tooth 21b of the release element 21. The impeller 10 then comes to a halt in the operative or cocked position even though the pin 8a moves away from the arm 10c.

The exposure is made in response to pivoting of the release element 21 in the direction indicated by the arrow 21f. The tooth 21a or 21b moves away from the arm 10c so that the spring 13 is free to contract and to propel the impeller 10 in a counterclockwise direction. The arm 10c strikes against the shutter blade 20 to rapidly propel the blade to its open position. The arm is then free to bypass the blade 20 and returns into abutment with the cocking pin 8a. The shutter blade 20 returns to the illustrated closed position under the action of the aforementioned spring to thus terminate the exposure.

When the arm 10c returns into abutment with the cocking pin 8a, the arm 10a moves its stud 10a' away from the adjacent leg of the torsion spring 15 so that the spring 14 is free to contract and moves the scanning lever 12 into engagement with the abutment 22b. Consequently, the feeler 12d is withdrawn from the adjacent perforation 11a so that the film transporting mechanism is free to transport the film 11 by the length of a frame. The scanning lever 12 causes its stud 12c to pivot the bell crank 16 back to the first position shown in FIG. 1 (by way of the lug 116c and torsion spring 18) whereby the pallet 16a moves away from the adjacent tooth 104 to permit rotation of the wheel 4 in a counterclockwise direction. At the same time, the pallet 16b prevents rotation of the wheel 4 in a clockwise direction under the action of the spring 5. The release element 21 automatically returns into engagement with the stop 21d under the action of the spring 21e as soon as the finger pressure in the direction of arrow 21f is relaxed or terminated. The camera is then ready for the next film transport which must precede the next exposure.

In order to insure that the lever 2 and wheel 4 can return to the illustrated starting positions even if the leader or the trailing end of the film 1 is connected with a strip of paper or the like which is not provided with perforations, the camera of FIG. 1 further comprises a disengaging lever 26 which is pivotable on a vertical shaft 24 and is biased by a spring 25. The free end of the disengaging lever 26 normally abuts against a projection or pin 4c of the wheel 4 whereby a projection or stud 26a on an intermediate portion of the lever 26 remains spaced from the right-hand arm of the bell crank 16. When the wheel 4 is rotated in a counterclockwise direction through an angle which exceeds the angle necessary to transport the film by the length of a frame (for example, when the leader of the film 11 is connected with a paper strip without perforations), a second projection or pin 4d of the wheel completes at least one-half of a full revolution about the axis of the shaft 102 and begins to pivot the disengaging lever 26 in a clockwise direction whereby the stud 26a disengages the pallet 16b from the adjacent teeth 104 to enable the spring 5 to return the wheel 4 into the starting position. Such return movement of the wheel 4 to starting position can take place when the lever 2 is released to the action of the spring 3 and abuts against the stop 19. Thus, the wheel 4 can periodically return to its starting position even while the feeler 12d tracks a web which is not provided with perforations. This insures that the film can be transported forwardly (arrow 11b) even if its leader or its trailing end is connected with an unperforated web or strip of paper or the like.

The user of the camera can feel the gradually increasing resistance which the wheel 4 offers to pivoting of the lever 2 in a counterclockwise direction. Such gradually increasing resistance is due to stressing of the springs 5, 13 and 15. Another advantage of the camera is that it utilizes a relatively small number of clutches, pawls and like parts.

Figure 2:
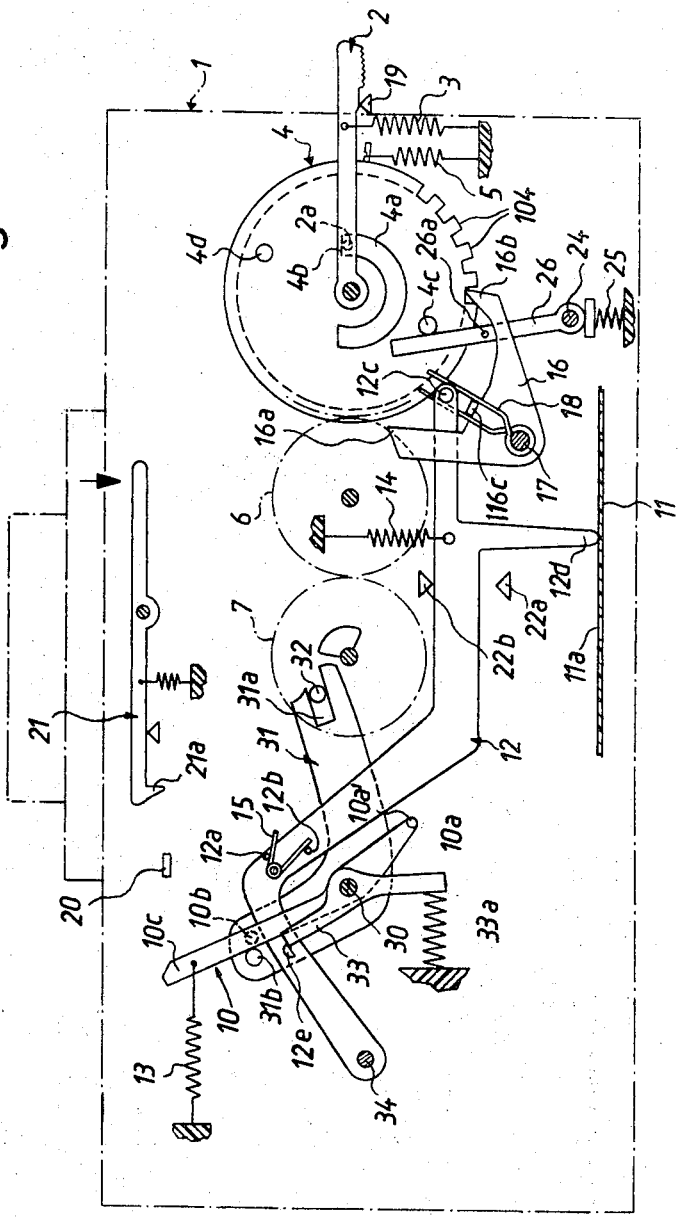
FIG. 2 is a similar schematic horizontal sectional view of a second still camera.

FIG. 2 illustrates a second still camera. All such parts of this second camera which are identical with or clearly analogous to the corresponding parts of the camera shown in FIG. 1 are denoted by similar reference characters. The gear 8 in the transmission 6, 7, 8 of FIG. 1 is replaced with a lever 31 which is pivotable about the axis of a shaft 30 in the housing 1 and has a slot 31a for an eccentric pin 32 of the gear 7. When the gear 7 rotates in a counterclockwise direction in response to counterclockwise rotation of the wheel 4 by way of the lever 2, the pin 32 enters the slot 31a and pivots the lever 31 in a clockwise direction whereby a cocking pin 31b of the lever 31 pivots the actuating member or impeller 10 against the opposition of the spring 13 so that the arm 10c of the impeller moves past the shutter blade 20 and beyond the tooth 21a of the release element 21. The pin 32 moves out of the slot 31a in response to counterclockwise rotation of the gear 7 through a predetermined angle.

The impeller 10 is pivotable about the axis of the shaft 30, and this shaft further supports a blocking lever 33 which is biased by a spring 33a and bears against a projecting portion or stop 12e on the scanning lever 12. The latter is pivotable on a fixed pin 34. When the pin 32 pivots the lever 31 in a clockwise direction (while the wheel 4 rotates the takeup reel in a direction to draw the film 11 off the supply reel), the cocking pin 31b pivots the arm 10c of the impeller 10 to move the arm 10c into engagement with the tooth 21a of the release element 21. The stud 10a' of the arm 10a pivots the locking lever 33 against the opposition of the spring 33a so that the upper arm of the locking lever 33 moves away from the stop 12e of the scanning lever 12. A stud 10b on the arm 10c of the impeller 10 stresses the torsion spring 15 on the scanning lever 12 so that the latter causes its feeler 12d to enter an oncoming perforation 11a of the film 11 and to disengage the pallet 16b from the teeth 104 while the pallet 16a moves into engagement with the adjacent tooth 104 to prevent further counterclockwise rotation of the wheel 4, i.e., to terminate the transport of the film 11. The wheel 4 is then free to return to its starting position under the action of the spring 5 whereby the pin 32 pivots the lever 31 in a counterclockwise direction and moves the cocking pin 31b away from the arm 10c of the impeller 10. The latter remains in the operative or cocked position, in which the arm 10c engages with the tooth 21a, until the user decides to make an exposure by pivoting the release element 21 in a clockwise direction.

In all other respects, the operation of the camera shown in FIG. 1 is identical with the operation of the first camera.

It is clear that the improved photographic apparatus is susceptible of many additional modifications. For example, the one-piece blocking or arresting device 16 can be replaced with two one-armed levers, one of which carries the pallet 16a and the other of which carries the pallet 16b, and a spring which biases the two one-armed levers in opposite directions. Furthermore, the actuating member or impeller 10 can be used to actuate a more sophisticated shutter with two or more blades. Still further, the actuating member or impeller 10 can be replaced with the wheel of a Geneva movement which cooperates with the pin 31b of the lever 31 shown in FIG. 2 in such a way that the pin 31b enters one slot of the Geneva wheel when the cocking action is completed and enters the next slot of the Geneva wheel when the lever 2 is pivoted again to transport the film by the length of a frame. Such arrangement would render it unnecessary to return the lever 31 into the illustrated position, i.e. the lever 31 or an analogous member can be driven in a single direction and moves only as long as the wheel 4 rotates in a counterclockwise direction.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a film transporting mechanism having a member rotatable by hand to turn in a predetermined direction; a shutter actuating device movable between an uncocked position and a cocked position; discrete motion transmitting means for moving said shutter actuating device from said uncocked position to said cocked position in response to turning of said member of said film transporting mechanism in said predetermined direction; a discrete movable film scanning device; and resilient biasing means for urging said scanning device against the photographic film in said apparatus in direct response to movement of said actuating device to and while said actuating device dwells in said cocked position thereof.

2. In a photographic apparatus for use with photographic film having a row of perforations, one for each film frame, a combination comprising means defining a path for photographic film; film transporting means including a member turnable in a predetermined direction to thereby effect the transport of the film along said path; a scanning device including feeler means arranged to track the film along said path and to enter an oncoming perforation to thereby prevent further movement of said member of said film transporting means in said predetermined direction; a discrete shutter actuating device movable between a first position and a second position; motion transmitting means interposed between said member of said film transporting means and said shutter actuating device to move the latter from said first position to said second position in response to movement of said member of said film transporting means in said predetermined direction; and resilient biasing means for urging said feeler means against the film in said path in direct response to movement of said shutter actuating device from said first to said second position thereof.

3. A combination as defined in claim 2, wherein at least one of said devices is pivotable about a predetermined axis and said member includes a gear, said motion transmitting means comprising at least one additional gear receiving torque from said member and further comprising blocking means for blocking further movement of said member in said predetermined direction in response to entry of said feeler means into an oncoming perforation, said blocking means receiving motion from said scanning device and being arranged to engage at least one tooth of one of said gears in response to entry of said feeler means into an oncoming perforation.

4. A combination as defined in claim 2, wherein said biasing means comprises a spring which is mounted on one of said devices.

5. A combination as defined in claim 2, further comprising means for supporting said actuating device for angular movement between said first and second positions.

6. A combination as defined in claim 2, further comprising second biasing means for urging said actuating device to said first position.

7. A combination as defined in claim 6, wherein the bias of said first mentioned biasing means upon said feeler means in said second position of said actuating device exceeds the bias of said second biasing means upon said actuating device.

8. A combination as defined in claim 6, further comprising release means operable to release said actuating device to the action of said second biasing means.

9. A combination as defined in claim 8, further comprising a shutter having at least one portion movable between open and closed positions and normally assuming said closed position, said portion extending into the path of movement of said actuating device from said second to said first position so that said portion is propelled by said actuating device from said closed to said open position thereof in response to operation of said release means.

10. A combination as defined in claim 2, wherein said biasing means includes an elongated elastic arm which is deformed to store energy in response to movement of said member in said predetermined direction.

11. In a photographic apparatus for use with roll film having a row of perforations, one for each film frame, a combination comprising a housing; means in said housing defining a path for roll film; film transporting means mounted in said housing and including a transporting member rotatable in a first direction to thereby transport the film along said path and in a second direction; scanning means including feeler means arranged to track the film along said path and to enter an oncoming perforation; and blocking means movable by said scanning means from a first position to a second position in response to entry of said feeler means into a perforation, said blocking means comprising a first portion which prevents rotation of said transporting member in said second direction in the first position of said blocking means and a second portion which prevents rotation of said transporting member in said first direction in the second position of said blocking means.

12. A combination as defined in claim 11, wherein said transporting member is a wheel having an annulus of teeth and said first and second portions of said blocking means respectively comprise first and second pallets which respectively engage said teeth in the first and second positions of said blocking means.

13. A combination as defined in claim 11, wherein said transporting member is a wheel having an annulus of teeth and said first and second portions of said blocking means respectively comprise first and second pallets which respectively engage said teeth in the first and second positions of said blocking means, said second pallet being arranged to ride over said teeth to permit rotation of said wheel in said second direction in the second position of said blocking means.

14. A combination as defined in claim 11, wherein said blocking means comprises a bell crank having a first arm including said first portion and a second arm including said second portion.

15. A combination as defined in claim 11, further comprising shutter means movable from a closed to an open position, actuating means movable from an inoperative position to an operative position and from said operative position to said inoperative position to thereby move said shutter means to said open position, and transmission means for moving said actuating means to said operative position in response to rotation of said transporting member in said first direction.

16. A combination as defined in claim 7, further comprising first biasing means for urging said feeler means against the film in response to movement of said actuating means from said inoperative to said operative position thereof.

17. A combination as defined in claim 16, further comprising second biasing means for permanently urging said feeler means away from engagement with the film in said path so that said feeler means withdrawn from the adjoining perforation of the film in response to movement of said actuating means to said inoperative position.

18. A combination as defined in claim 17, wherein the bias of said first biasing means exceeds the bias of said second biasing means so that said feeler means bears against the film in the operative position of said actuating means.

19. A combination as defined in claim 15, wherein said actuating means comprises impeller means which is cocked in said operative position and is arranged to strike against said shutter means during movement from said operative to said inoperative position.

20. A combination as defined in claim 15, wherein said transmission means comprises a gear having a motion transmitting portion which moves said actuating means from said inoperative to said operative position in response to rotation of said transporting member in said first direction.

21. A combination as defined in claim 20, wherein said motion transmitting portion of said gear is an eccentric pin.

22. A combination as defined in claim 15, wherein said transmission means comprises a lever which is pivotable in a predetermined direction in response to rotation of said transporting member in said first direction to thereby move said actuating means from said inoperative to said operative position.

23. A combination as defined in claim 22, wherein said transmission means further comprises a rotary member which receives motion from said transporting member in response to rotation of said transporting member in said first direction and a pin-and-slot connection between said rotary member of said transmission means and said lever.

24. A combination as defined in claim 15, further comprising locking means for normally holding said scanning means in a position corresponding to the first position of said blocking means and means provided on said actuating means for disengaging said locking means from said scanning means in response to movement of said actuating means to said operative position thereof.

25. A combination as defined in claim 24, wherein said scanning means comprises a first lever which is pivotable about a first axis and said locking means comprises a second lever which is pivotable about a second axis and normally engages a portion of said first lever, said means for disengaging comprising a projection provided on said actuating means and arranged to pivot said second lever away from engagement with said portion of said first lever in response to movement of said actuating means from said inoperative position thereof.

26. A combination as defined in claim 11, further comprising disengaging means for moving said blocking means to said second position independently of said scanning means in response to predetermined angular movement of said transporting member in said first direction.

27. A combination as defined in claim 26, wherein said disengaging means comprises a lever pivotable about a predetermined axis and a motion transmitting projection provided on said transporting member and arranged to pivot said lever in a direction to move said blocking means to said second position in response to said predetermined angular displacement of said transporting member in said first direction.

28. A combination as defined in claim 27, wherein said transporting member comprises a second projection arranged to maintain said disengaging member out of engagement with said blocking means in a starting position of said transporting member.

29. A combination as defined in claim 11, further comprising a lever coaxial with said transporting member and pivotable by hand to rotate said transporting member in said first direction.

* * * * *